(12) United States Patent
Nose et al.

(10) Patent No.: US 6,445,431 B2
(45) Date of Patent: Sep. 3, 2002

(54) LIQUID CRYSTAL DISPLAY WITH POLARIZATION LAYER INTERIOR TO SUBSTRATES

(75) Inventors: Takashi Nose; Setuo Kaneko; Masayoshi Suzuki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/732,920

(22) Filed: Dec. 11, 2000

Related U.S. Application Data (62) Division of application No. 09/127,054, filed on Jul. 31, 1998, now Pat. No. 6,243,151.

(30) Foreign Application Priority Data

Jul. 31, 1997 (JP) .............................. 9-206224

(51) Int. Cl.[7] ...................... G02F 1/1335; G02F 1/1333
(52) U.S. Cl. .............................. 349/70; 349/61; 349/62; 349/96
(58) Field of Search .............................. 349/96, 70, 61, 349/62

(56) References Cited

U.S. PATENT DOCUMENTS

| | | | | |
|---|---|---|---|---|
| 4,220,705 A | | 9/1980 | Sugibuchi et al. .......... | 430/294 |
| 4,772,885 A | * | 9/1988 | Uehara et al. ............... | 340/784 |
| 4,793,691 A | * | 12/1988 | Enomoto et al. ........... | 350/339 |
| 4,872,741 A | | 10/1989 | Dakin et al. ................. | 313/621 |
| 5,146,355 A | | 9/1992 | Prince et al. ................. | 349/71 |

(List continued on next page.)

FOREIGN PATENT DOCUMENTS

| | | |
|---|---|---|
| JP | 51109796 | 9/1976 |
| JP | 6037591 | 2/1985 |
| JP | 6084580 | 5/1985 |
| JP | 336518 | 2/1991 |
| JP | 7318728 | 12/1995 |
| JP | 862602 | 3/1996 |
| JP | 8171013 | 7/1996 |
| JP | 8334615 | 12/1996 |

OTHER PUBLICATIONS

D.J. Broer et al., "In–situ photopolymerization of oriented liquid–crystalline acrylates, 3a)," Makromol Chemistry, vol. 190, 1989, pp. 2255–2268.

W.M. Gibbons et al., "Surface–mediated alignment of nematic liquid crystals with polarized laser light," Letters to Nature, vol. 351, 1991, p. 49.

(List continued on next page.)

*Primary Examiner*—William L. Sikes
*Assistant Examiner*—Tarifur R. Chowdhury
(74) *Attorney, Agent, or Firm*—Young & Thompson (57) ABSTRACT

There is provided a liquid crystal display including (a) a backlight source having a dominant emission peak at 380–420 nm, (b) a first polarization layer for selecting a light directed in a predetermined direction among lights emitted from the backlight source, (c) a second polarization layer for receiving a light selected by the first polarization layer, (d) first and second transparent substrates, (e) first and second transparent electrodes, (f) a liquid crystal layer, and (g) a fluorescent material layer receiving lights from the backlight source and emitting a light therefrom. The second polarization layer is located intermediate between the first and second transparent substrates. The backlight source, the first polarization layer, the first transparent substrate, the first transparent electrode, the liquid crystal layer, the second transparent electrode, the second polarization layer, the fluorescent material layer, and the second transparent substrate are preferably deposited from bottom to top in this order. The above-mentioned liquid crystal display makes it possible to reduce the number of transparent substrates by one relative to a conventional liquid crystal display, which ensures higher brightness and no parallax.

2 Claims, 7 Drawing Sheets

U.S. PATENT DOCUMENTS

| | | | | |
|---|---|---|---|---|
| 5,146,415 | A |  | 9/1992 | Faris ........................... 358/1.1 |
| 5,179,457 | A |  | 1/1993 | Hirataka et al. ............. 349/119 |
| 5,608,554 | A |  | 3/1997 | Do et al. ....................... 349/70 |
| 5,686,979 | A |  | 11/1997 | Weber et al. ................. 349/96 |
| 5,694,183 | A |  | 12/1997 | Ilcisin et al. .................. 349/42 |
| 5,818,559 | A | * | 10/1998 | Yoshida ....................... 349/122 |
| 5,899,551 | A | * | 5/1999 | Neijzen et al. ............. 349/115 |
| 5,986,730 | A |  | 11/1999 | Hansen et al. ................ 349/96 |
| 6,046,787 | A |  | 4/2000 | Nishiguchi ................... 349/129 |
| 6,067,136 | A | * | 5/2000 | Yamaguchi et al. .......... 349/96 |
| 6,124,907 | A | * | 9/2000 | Jones et al. ................... 349/96 |
| 6,181,394 | B1 | * | 1/2001 | Sanelle et al. ................ 349/96 |
| 6,252,254 | B1 | * | 6/2001 | Soules et al. ................. 257/89 |

OTHER PUBLICATIONS

M. Schadt et al., "Surface–Induced parallel Alignment of Liquid Crystals by Linearly Polymerized Photopolymers," Japanese Journal of Applied Physics, vol. 31, 1992, pp. 2155–2164.

A.V. Ivashchenko et al., "Dyes in Liquid Crystals," Mol. Cryst. Liq. cryst., vol. 150A, 1987, pp. 3–167.

* cited by examiner

LIQUID CRYSTAL DISPLAY WITH POLARIZATION LAYER INTERIOR TO SUBSTRATES

This is a divisional of Ser. No. 09/127,054 filed, Jul. 31, 1998 now U.S. Pat. No. 6,243,151.

BACKGROUND OF THE INVENTION

1. Field of the Invention

The invention relates to a liquid crystal display, and more particularly to a liquid crystal display for accomplishing color expression.

2. Description of the Related Art

A liquid crystal display is a light-receiving device, and generally has a structure of a pair of transparent electrodes, liquid crystal sandwiched between the transparent electrodes, and a pair of polarization plates situated at front and rear of the display. As a light source is usually employed a light source emitting white lights.

In order to accomplish color expression in such a liquid crystal display, color filters of red (R), green (G) and blue (B), which are three primary colors, are prepared, and white lights emitted from a light source are allowed to pass through liquid crystal or not by selectively turning the liquid crystal on or off. The white lights allowed to pass the through liquid crystal enter the color filters at their rears, and exit the color filters as red, green or blue lights. The color filters are usually arranged in a mosaic pattern or a striped pattern. For instance, a liquid crystal display employing color filters is suggested in Japanese Unexamined Patent Publications No. 60-37591 published on Feb. 26, 1985, No. 60-84580 published on May 13, 1985, and No. 3-36518 published on Feb. 18, 1991.

Figure 1:
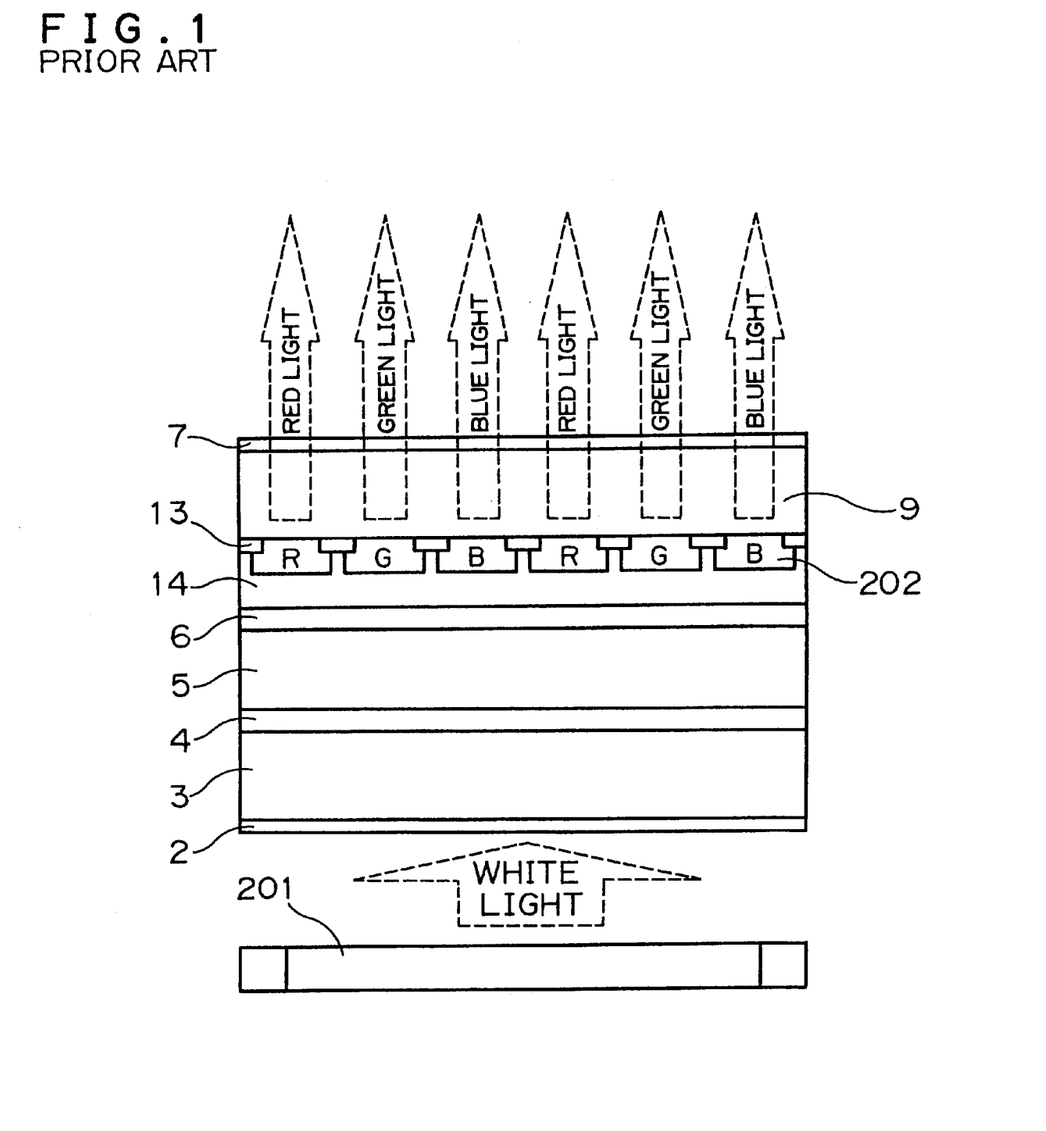
FIG. 1 is a cross-sectional view of a conventional liquid crystal display employing color filters.

FIG. 1 is a cross-sectional view of a conventional liquid crystal display for accomplishing color expression.

The illustrated liquid crystal display is comprised of a backlight source 201 located at the bottom, which emits white lights, a first polarization layer 2 selecting a light directed in a predetermined direction among backlights emitted from the backlight source 201, and a second polarization layer 7 receiving a light selected by the first polarization layer 2. Between the first and second polarization layers 2 and 7 are sandwiched, in this order from bottom to top, a first transparent substrate 3 composed of transparent material such as glass, a first transparent electrode 4 composed of indium-tin-oxide (ITO), liquid crystal 5, a second transparent electrode 6, an overcoat layer 14 composed of transparent resin, color filters 202 of red, green and blue, and a second transparent substrate 9.

As illustrated in FIG. 1, red, green and blue color filters R, G, and B are regularly arranged, and light-impermeable layers 13 are formed between the color filters 202. The light-impermeable layers 13 are arranged differently in dependence on how the liquid crystal display is driven. Some of liquid crystal displays are designed to have no light-impermeable layers 13. The color filters 202 may be situated differently from FIG. 1. For instance, the color filters 202 may be situated on or above the second polarization layer 7. The first and second polarization layers 2 and 7 are usually comprised of a polarizing element such as iodine and dye which provides dichroism, a polarizing base substrate for arranging and fixating polarizing elements, such as polyvinyl alcohol, and a substrate for supporting the polarizing base substrate at either sides, such as triacetyl cellulose.

A triple channel tube is usually employed as the backlight source 201, and the color filters 202 are required to have spectral transmission factor characteristic consistent with emission spectrum of the backlight source 201.

Figure 2:
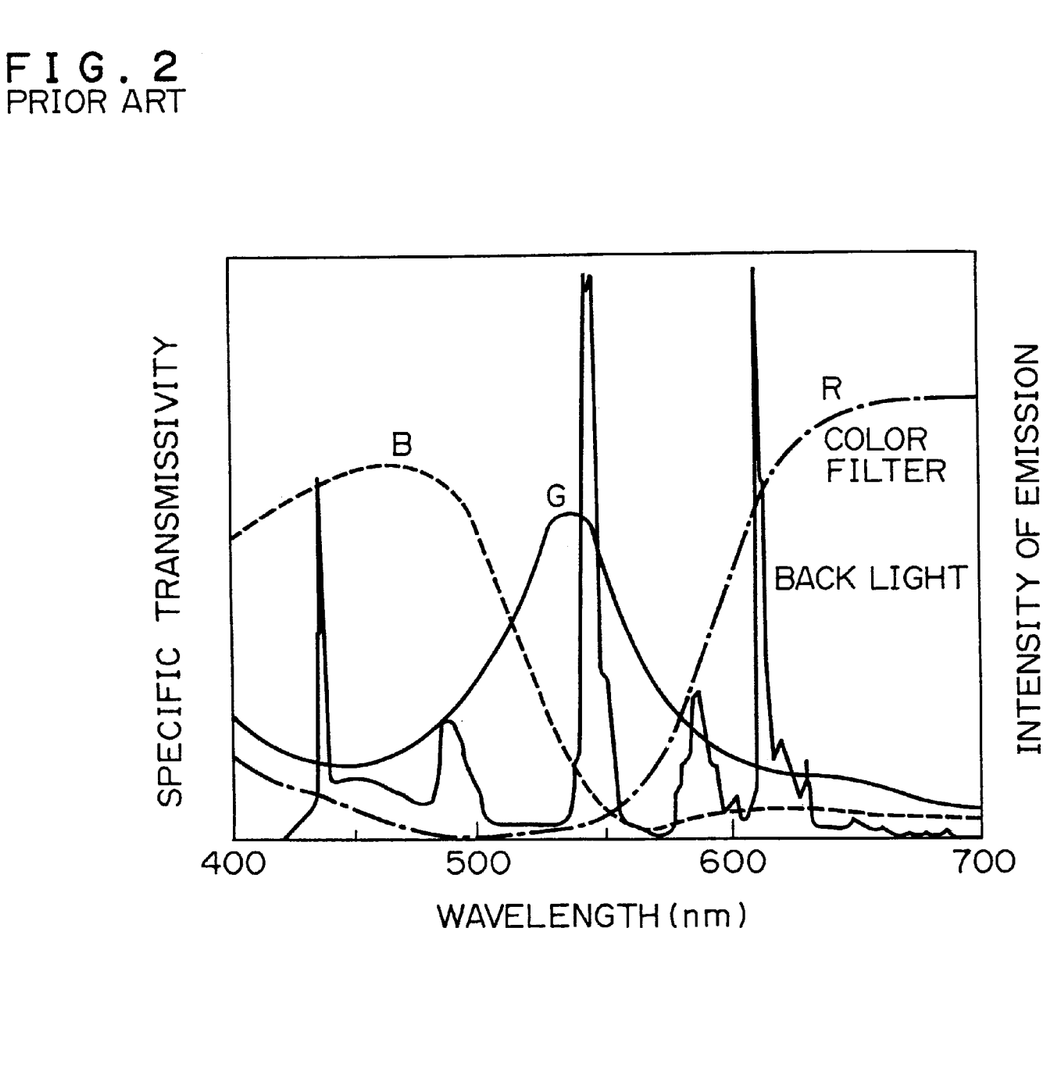
FIG. 2 is a graph showing spectral transmission factor of color filters and emission profile of a backlight source.

FIG. 2 illustrates an example of spectral transmission factor of color filters and emission profile of a backlight source. In a liquid crystal display employing color filters for accomplishing color expression, an efficiency of utilizing a light is decreased, as illustrated in FIG. 2, because white lights emitted from a backlight source pass through the color filters. Hence, lights having passed through the color filters have an intensity about one-third smaller than an intensity of the white lights originally emitted from the backlight source. Thus, there is a problem that the lights leaving the color filters become quite weak.

In order to solve this problem, there have been suggested liquid crystal displays employing fluorescent material in place of color filters. One of such liquid crystal displays is suggested in Japanese Unexamined Patent Publication No. 8-62602 published on Mar. 8, 1996. The suggested liquid crystal display includes a backlight source emitting blue lights having a wavelength in the range of 380 nm to 420 nm, in place of a backlight source emitting white lights, and fluorescent materials excited by blue lights emitted from the backlight source and emitting lights of various colors.

Figure 3:
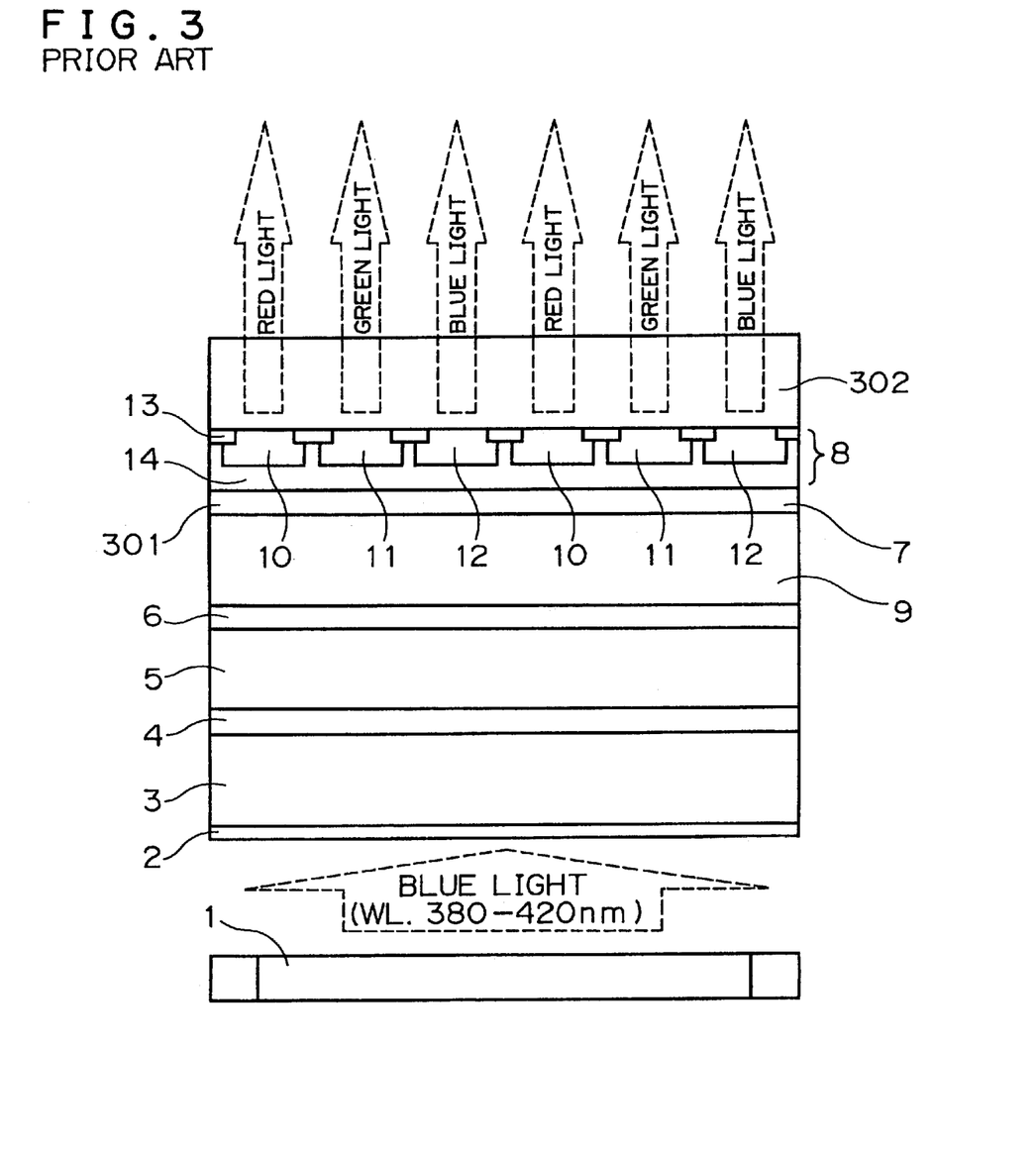
FIG. 3 a cross-sectional view of a conventional liquid crystal display employing fluorescent materials.

FIG. 3 is a cross-sectional view of the liquid crystal display suggested in the above-mentioned Publication. The illustrated liquid crystal display includes a backlight source 1 emitting blue lights having a wavelength in the range of 380 nm to 420 nm, a first polarization layer 2, a first transparent substrate 3, a first transparent electrode 4, liquid crystal 5, a second transparent electrode 6, a second transparent substrate 9, a second polarization layer 7, a mirror 301 through which lights pass from the rear, a fluorescent material layer 8, and a third transparent substrate 302, which are deposited from bottom to top in this order.

The fluorescent material layer 8 is comprised of a first fluorescent material 10 emitting red lights, a second fluorescent material 11 emitting green lights 11, a third fluorescent material 12 emitting blue lights, light-impermeable layers 13 situated between the first to third fluorescent materials 10, 11, and 12, and an overcoat layer 14 covering the first to third fluorescent materials 10, 11 and 12 therewith. The first to third fluorescent materials 10, 11 and 12 are regularly arranged, and are excited with the blue lights having a wavelength in the range of 380 nm to 420 nm and emitted from the backlight source 1.

The mirror 301 is provided for directing lights forwardly only. Without the mirror 301, lights having passed through the fluorescent materials 10, 11 and 12 are scattered in all directions. Lights emitted from the backlight source 1 pass through the mirror 301, and are reflected only forwardly by the mirror 301.

Since this liquid crystal display does not employ color filters, it is possible to avoid lights from being decayed due to color filters, ensuring greater brightness.

In fact, the liquid crystal display suggested in the above-mentioned Publication does not include the first and second transparent substrates 3 and 9. Hence, it is not limited in the above-mentioned Publication as to whether the second polarization layer 7 is located between the first and second transparent substrates 3 and 9, or located outside the first and second transparent substrates 3 and 9.

However, since a conventional liquid crystal display employs a polarizing plate as a polarization layer, it is necessary to position the second polarization layer 7 outside both the first and second transparent substrates 3 and 9, as illustrated in FIG. 3, and hence, it is not allowed to position the second polarization layer 7 between the first and second transparent substrates 3 and 9. Thus, above the liquid crystal 5 are located two transparent substrates 9 and 302, which would generate parallax.

SUMMARY OF THE INVENTION

In view of the foregoing problems in the prior art, it is an object of the present invention to provide a liquid crystal display ensuring greater brightness and no parallax.

There is provided a liquid crystal display including (a) a backlight source having a dominant emission peak at 380–420 nm, (b) a first polarization layer for selecting a light directed in a predetermined direction among lights emitted from the backlight source, (c) a second polarization layer for receiving a light selected by the first polarization layer, (d) first and second light-permeable substrates, (e) first and second light-permeable electrodes, (f) a liquid crystal layer, and (g) a fluorescent material layer receiving lights from the backlight source and emitting a light therefrom, the second polarization layer being located intermediate between the first and second light-permeable substrates.

It is preferable that the backlight source, the first polarization layer, the first light-permeable substrate, the first light-permeable electrode, the liquid crystal layer, the second light-permeable electrode, the second polarization layer, the fluorescent material layer, and the second light-permeable substrate are deposited from bottom to top in this order.

It is preferable that the backlight source emits blue lights.

It is also preferable that the fluorescent material layer includes a first fluorescent material emitting red lights in response to lights emitted from the backlight source, a second fluorescent material emitting green lights in response to lights emitted from the backlight source, a third fluorescent material emitting blue lights in response to lights emitted from the backlight source, the first to third fluorescent materials being arranged in a line, and light-impermeable layers located between the first to third fluorescent materials.

The fluorescent material layer may further include an overcoat layer composed of light-permeable resin and covering the first to third fluorescent materials therewith.

For instance, the second polarization layer may be formed by the steps of forming a fluorescent material layer on a light-permeable substrate, forming an overcoat layer over the fluorescent material layer, applying orientation to the overcoat layer, forming a layer containing photosensitive liquid crystal and dichroism pigment on the overcoat layer, and emitting a light to the layer to cure the photosensitive liquid crystal. In the above-mentioned case, the orientation is preferably rubbing.

As an alternative, the second polarization layer may be formed by the steps of forming a fluorescent material layer on a light-permeable substrate, forming an overcoat layer over the fluorescent material layer, forming a layer on the overcoat layer, which layer contains polymer and dichroism pigment which is isomerized on receiving a light, and emitting a polarized light to the layer.

The second polarization layer may be formed by the steps of forming a fluorescent material layer on a light-permeable substrate, forming an overcoat layer over the fluorescent material layer, forming a layer on the overcoat layer, which layer contains photosensitive polymer and dichroism pigment, and emitting a polarized light to the layer.

There is further provided a liquid crystal display including (a) a backlight source having a dominant emission peak at 380–420 nm, (b) a first polarization layer for selecting a light directed in a predetermined direction among lights emitted from the backlight source, (c) a second polarization layer for receiving a light selected by the first polarization layer, (d) first and second light-permeable substrates, (e) first and second light-permeable electrodes, (f) a liquid crystal layer, and (g) a fluorescent material layer receiving lights from the backlight source and emitting a light therefrom, the first and second polarization layers being located intermediate between the first and second light-permeable substrates.

It is preferable that the backlight source, the first light-permeable substrate, the first polarization layer, the first light-permeable electrode, the liquid crystal layer, the second light-permeable electrode, the second polarization layer, the fluorescent material layer, and the second light-permeable substrate are deposited from bottom to top in this order.

There is still further provided a liquid crystal display including (a) a backlight source having a dominant emission peak at 460–470 nm, (b) a first polarization layer for selecting a light directed in a predetermined direction among lights emitted from the backlight source, (c) a second polarization layer for receiving a light selected by the first polarization layer, (d) first and second light-permeable substrates, (e) first and second light-permeable electrodes, (f) a liquid crystal layer, and (g) a fluorescent material layer receiving lights from the backlight source and emitting a light therefrom, the second polarization layer being located intermediate between the first and second light-permeable substrates.

It is preferable that the backlight source, the first polarization layer, the first light-permeable substrate, the first light-permeable electrode, the liquid crystal layer, the second light-permeable electrode, the second polarization layer, the fluorescent material layer, and the second light-permeable substrate are deposited from bottom to top in this order.

It is preferable that the backlight source emits blue lights, in which case, the fluorescent material layer may preferably include a first fluorescent material emitting red lights in response to lights emitted from the backlight source, a second fluorescent material emitting green lights in response to lights emitted from the backlight source, a transparent film passing therethrough lights emitted from the backlight source, the first and second fluorescent materials and the transparent film being arranged in a line, and light-impermeable layers located between the first and second fluorescent materials and the transparent film.

There is yet further provided a liquid crystal display including (a) a backlight source having a dominant emission peak at 460–470 nm, (b) a first polarization layer for selecting a light directed in a predetermined direction among lights emitted from the backlight source, (c) a second polarization layer for receiving a light selected by the first polarization layer, (d) first and second light-permeable substrates, (e) first and second light-permeable electrodes, (f) a liquid crystal layer, and (g) a fluorescent material layer receiving lights from the backlight source and emitting a light therefrom, the first and second polarization layers being located intermediate between the first and second light-permeable substrates.

It is preferable that the backlight source, the first light-permeable substrate, the first polarization layer, the first light-permeable electrode, the liquid crystal layer, the second light-permeable electrode, the second polarization layer, the fluorescent material layer, and the second light-permeable substrate are deposited from bottom to top in this order.

In the liquid crystal display in accordance with the present invention, a polarization layer including fluorescent materials is situated between a pair of light-permeable substrates. This arrangement ensures that the liquid crystal display in accordance with the present invention has light-permeable substrates smaller by one in the number than a conventional liquid crystal display. Hence, there is accomplished a liquid crystal display having greater brightness and no parallax.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 4:
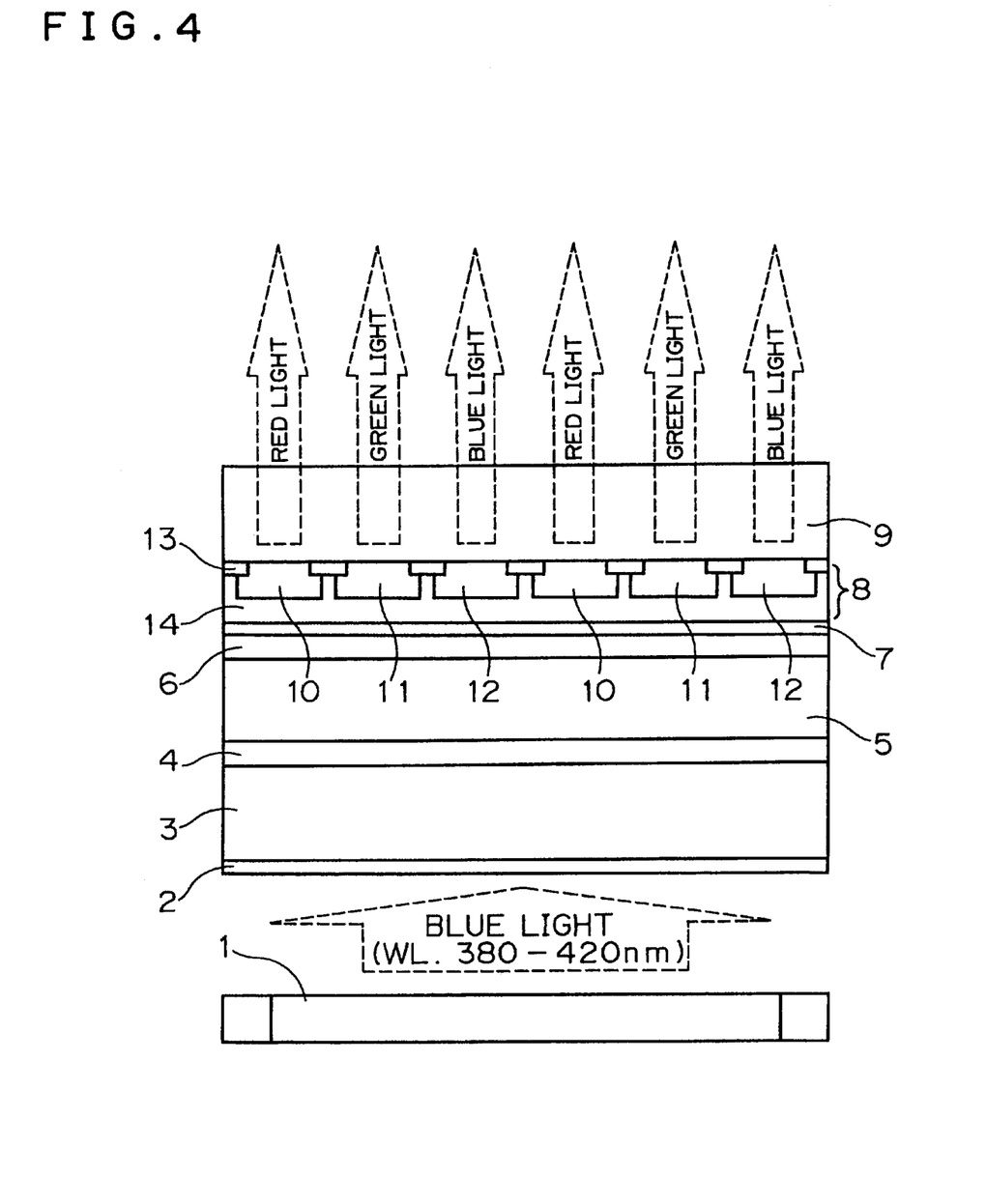
FIG. 4 is a cross-sectional view illustrating a liquid crystal display in accordance with the first embodiment of the present invention.

FIG. 4 illustrates a liquid crystal display in accordance with the first embodiment of the present invention.

The illustrated liquid crystal display is comprised of a backlight source 1 emitting blue lights having a wavelength in the range of 380 nm to 420 nm, a first polarization layer 2 selecting a light directed in a predetermined direction among backlights emitted from the backlight source 1, a first transparent substrate 3, a first transparent electrode 4, liquid crystal 5, a second transparent electrode 6, a second polarization layer 7, a fluorescent material layer 8, and a second transparent substrate 9, which are deposited from bottom to top in this order.

The first and second transparent electrodes 4 and 6 may be of active matrix driving type or simple matrix driving type.

The fluorescent material layer 8 is comprised of a first fluorescent material 10 emitting red lights, a second fluorescent material 11 emitting green lights, a third fluorescent material 12 emitting blue lights, light-impermeable layers 13 situated between the first to third fluorescent materials 10, 11, and 12, and an overcoat layer 14 covering the first to third fluorescent materials 10, 11 and 12 therewith. The first to third fluorescent materials 10, 11 and 12 are regularly arranged, and are excited with the blue lights having a wavelength in the range of 380 nm to 420 nm, emitted from the backlight source 1, to thereby emit lights therefrom The overcoat layer 14 is composed of transparent resin. Since the overcoat layer 14 is not necessary in view of the principle of liquid crystal, the liquid crystal display may be designed not to include the overcoat layer 14.

The first to third fluorescent materials 10, 11 and 12 are patterned in a mosaic or stripe in accordance with a use of a liquid crystal display, similarly to a pattern of color filters in a conventional liquid crystal display.

A commercially available polarizing plate fabricated in accordance with a conventional process is employed as the first polarization layer 2. The second polarization layer 7 may be formed also in accordance with a conventional method. That is, the second polarization layer 7 may be formed by the steps of introducing polyiodine or dye into polyvinyl alcohol as a base, expanding the mixture, and attached expanded mixture onto a substrate. However, in the first embodiment, the second polarization layer 7 is formed in accordance with one of the following processes A, B, C and D, among which the processes C and D are preferable in view of simplicity of a process.

[Process A]

First, a light-impermeable layer, a fluorescent material layer, and an overcoat layer are formed on a transparent substrate in a conventional manner. Then, the overcoat layer is rubbed. The overcoat layer is usually composed of acrylate. However, it is preferable that the overcoat layer is composed of polyimide in view of durability. An orientation film may be applied onto the overcoat layer.

The overcoat layer or the orientation film is rubbed to thereby form a first substrate. Then, only an orientation film is applied to a transparent substrate such as glass, and thereafter is rubbed to thereby form a second substrate. Then, desired spacer agent is applied to the second substrate, or a pillar or wall acting as a spacer is formed in desired portions of the second substrate by photolithography.

Then, the first and second substrates are laid one on another in such a manner that rubbing directions of them are anti-parallel or parallel with each other, and then fixedly adhered to each other by means of an appropriate support. A polyimide film having the same thickness as that of the spacer agent may be formed at a periphery of the substrates. A wall may be formed at a periphery of the substrates by photolithography when the spacer is formed.

Between the first and second substrates is introduced a mixture of liquid crystal including photosensitive groups, and dichroism pigment. The liquid crystal is oriented in the rubbing direction, and accordingly, the dichroism pigment is also oriented in the rubbing direction.

Then, ultra-violet (UV) rays are radiated all over the first and second substrates to thereby fixate orientation of the liquid crystal and the dichroism pigment. Thereafter, the second substrate is peeled off the first substrate. Thus, there is obtained a polarization layer on the overcoat layer of the first substrate.

[Process B]

In place of rubbing an orientation film as mentioned in Process A, the second polarization film may be formed by radiating polarized lights to photosensitive material, as suggested in Japanese Journal of Applied Physics, Vol. 31, pp. 2155, 1992.

[Process C]

The second polarization film may be formed as follows. First, a light-impermeable layer, a fluorescent material layer, and an overcoat layer are formed on a transparent substrate in a conventional manner. Then, a mixture of polymer and a pigment which will be isomerized on receiving lights is applied to the product. After drying the mixture, a linearly polarized light is radiated to the mixture to thereby induce photoreaction for controlling an arrangement of pigment. The thus made film acts as a polarization layer.

[Process D]

The second polarization film may be formed as follows. First, a light-impermeable layer, a fluorescent material layer, and an overcoat layer are formed on a transparent substrate in a conventional manner. Then, a mixture of polymer and a dichroism pigment having photosensitivity is applied to the product. After drying the mixture, a linearly polarized light is radiated to the mixture to thereby cause selectively pigments in which a transition moment is directed in a polarization direction, to react for combining with the polymer. The pigments having not combined with the polymer are washed away by a solvent. Thus, there is obtained a layer including a dichroism pigment oriented in a polarization direction. The thus made film acts as a polarization layer.

The above-mentioned Processes A to D have been explained as methods of forming the second polarization layer 7. However, it should be noted that the above-mentioned Processes A to D may be applied to formation of any polarization layer. Two or more of the above-mentioned Processes A to D may be combined for forming the second polarization layer 7 or any other polarization layer.

As is obvious in view of FIG. 4, the liquid crystal display in accordance with the first embodiment makes it no longer necessary to employ the third transparent substrate 302 which was employed in a conventional liquid crystal display, as illustrated in FIG. 3. As a result, the liquid crystal display in accordance with the first embodiment ensures no parallax.

In the conventional liquid crystal display illustrated in FIG. 1, which employs the color filters 202, two-thirds or greater of lights emitted from the backlight source 201 was lost. Comparing to the conventional liquid crystal display illustrated in FIG. 1, the liquid crystal display in accordance with the first embodiment can avoid such an optical loss in the color filters 202, and hence, ensure greater brightness than the conventional liquid crystal display. That is, the first embodiment provides a liquid crystal display having greater brightness and no parallax.

Second Embodiment

Figure 5:
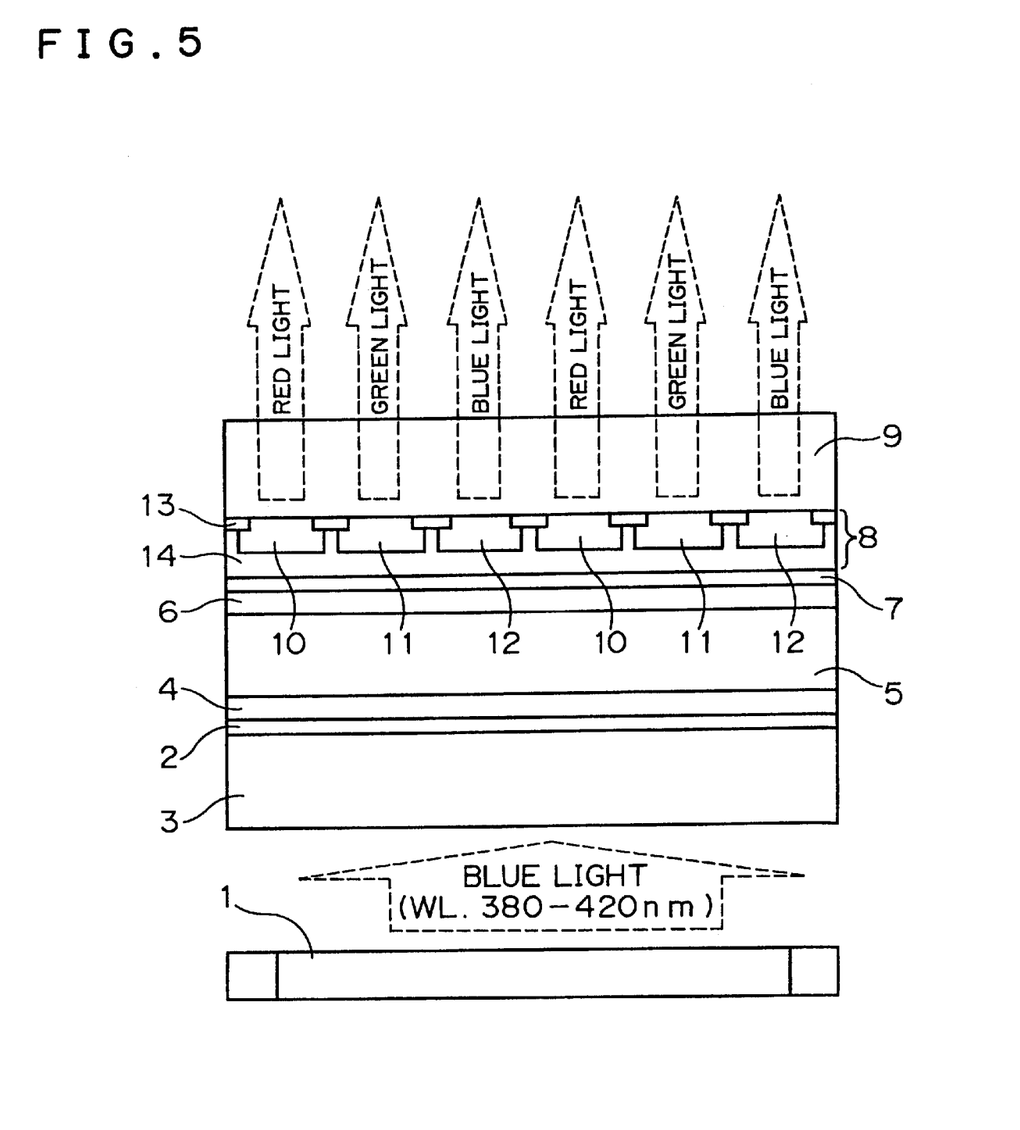
FIG. 5 is a cross-sectional view illustrating a liquid crystal display in accordance with the second embodiment of the present invention.

FIG. 5 illustrates a liquid crystal display in accordance with the second embodiment of the present invention.

The illustrated liquid crystal display is comprised of a backlight source 1 emitting blue lights having a wavelength in the range of 380 nm to 420 nm, a first transparent substrate 3, a first polarization layer 2, a first transparent electrode 4, liquid crystal 5, a second transparent electrode 6, a second polarization layer 7, a fluorescent material layer 8, and a second transparent substrate 9, which are deposited from bottom to top in this order.

The fluorescent material layer 8 is comprised of a first fluorescent material 10 emitting red lights, a second fluorescent material 11 emitting green lights, a third fluorescent material 12 emitting blue lights, light-impermeable layers 13 situated between the first to third fluorescent materials 10, 11, and 12, and an overcoat layer 14 covering the first to third fluorescent materials 10, 11 and 12 therewith. The first to third fluorescent materials 10, 11 and 12 are regularly arranged, and are excited with the blue lights having a wavelength in the range of 380 nm to 420 nm, emitted from the backlight source 1, to thereby emit lights therefrom.

The liquid crystal display in accordance with the second embodiment is different from the first embodiment illustrated in FIG. 4 in that the first polarization layer 2 as well as the second polarization layer 7 is located intermediate between the first and second transparent substrates 3 and 9.

Similarly to the second polarization layer 7, the first polarization layer 2 is formed in accordance with one of the above-mentioned Processes A, B, C and D, among which the Processes C and D are preferable in view of simplicity of a process.

Third Embodiment

Figure 6:
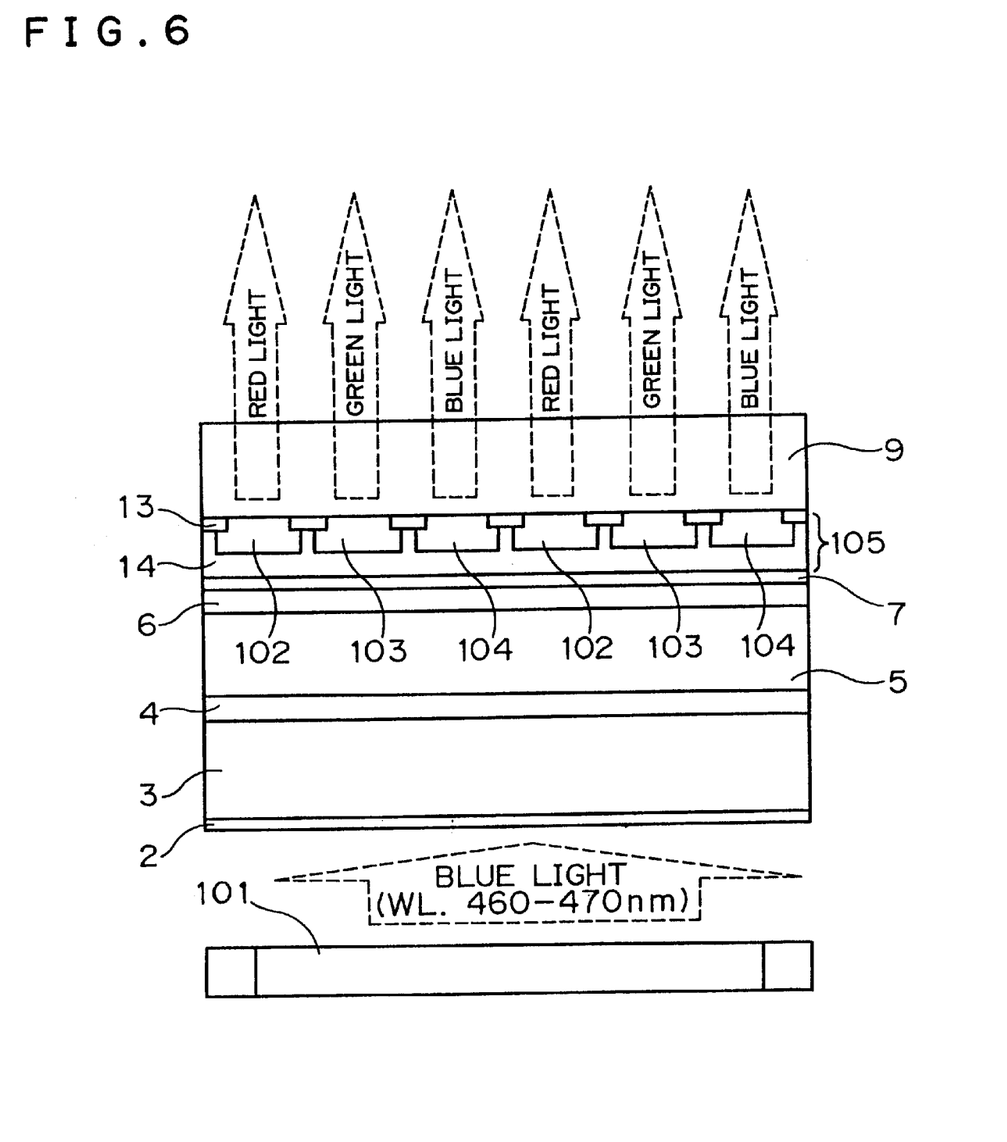
FIG. 6 is a cross-sectional view illustrating a liquid crystal display in accordance with the third embodiment of the present invention.

FIG. 6 illustrates a liquid crystal display in accordance with the third embodiment of the present invention.

The illustrated liquid crystal display is comprised of a backlight source 101 emitting blue lights having a wavelength in the range of 460 nm to 470 nm, a first polarization layer 2, a first transparent substrate 3, a first transparent electrode 4, liquid crystal 5, a second transparent electrode 6, a second polarization layer 7, a fluorescent material layer 105, and a second transparent substrate 9, which are deposited from bottom to top in this order.

The fluorescent material layer 105 is comprised of a first fluorescent material 102 emitting red lights, a second fluorescent material 103 emitting green lights 11, a transparent film 104, light-impermeable layers 13 situated between the first and second fluorescent materials 102, 103, and the transparent film 104, and an overcoat layer 14 covering the first and second fluorescent materials 102, 103 and the transparent film 104 therewith. The first and second fluorescent materials 102 and 103 are excited with the blue lights having a wavelength in the range of 460 nm to 470 nm, emitted from the backlight source 101, to thereby emit lights therefrom. The transparent film 104 passes therethrough the blue lights emitted from the backlight source 101.

In accordance with the third embodiment, the second polarization layer 7 is located between the first and second transparent substrates 3 and 9. Hence, similarly to the first embodiment, the second polarization layer 7 is formed in accordance with one or more of the above-mentioned Processes A, B, C and D, among which the Processes C and D are preferable in view of simplicity of a process.

Since the transparent film 104 passes therethrough the blue lights emitted from the backlight source 101, a brightness of blue lights is about three times greater than a brightness of blue lights in a conventional liquid crystal display. As to red and green lights, there can be obtained a brightness about three times greater than that of a conventional liquid crystal display by composing the first and second fluorescent materials 102 and 103 of newly developed materials having high conversion efficiency.

Fourth Embodiment

Figure 7:
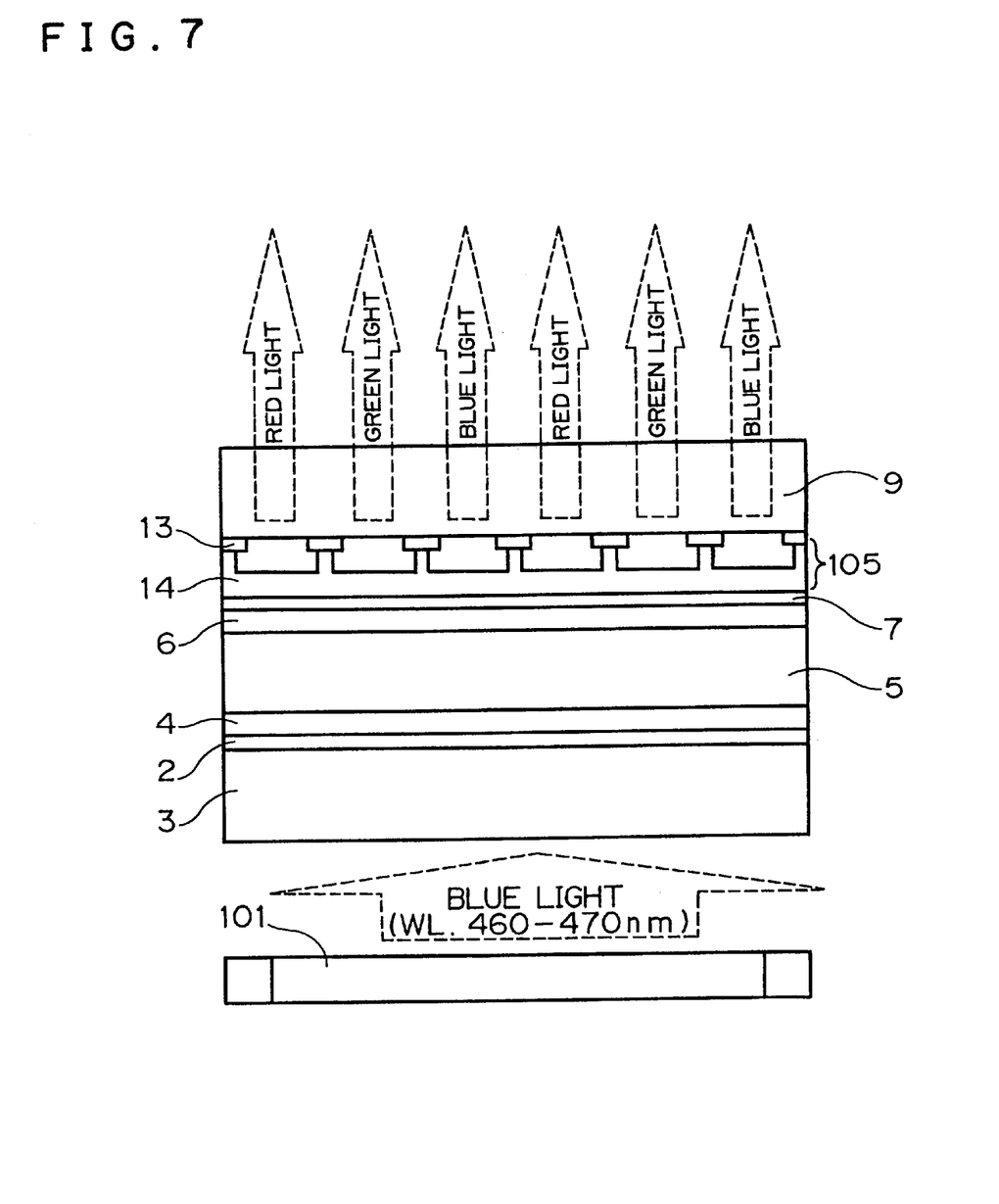
FIG. 7 is a cross-sectional view illustrating a liquid crystal display in accordance with the fourth embodiment of the present invention.

FIG. 7 illustrates a liquid crystal display in accordance with the fourth embodiment of the present invention.

The illustrated liquid crystal display is comprised of a backlight source 101 emitting blue lights having a wavelength in the range of 460 nm to 470 nm, a first transparent substrate 3, a first polarization layer 2, a first transparent electrode 4, liquid crystal 5, a second transparent electrode 6, a second polarization layer 7, a fluorescent material layer 105, and a second transparent substrate 9, which are deposited from bottom to top in this order.

The fluorescent material layer 105 is comprised of a first fluorescent material 102 emitting red lights, a second fluorescent material 103 emitting green lights 11, a transparent film 104, light-impermeable layers 13 situated between the first and second fluorescent materials 102, 103, and the transparent film 104, and an overcoat layer 14 covering the first and second fluorescent materials 102, 103 and the transparent film 104 therewith. The first and second fluorescent materials 102 and 103 are excited with the blue lights having a wavelength in the range of 460 nm to 470 nm, emitted from the backlight source 101, to thereby emit lights therefrom. The transparent film 104 passes therethrough the blue lights emitted from the backlight source 101.

The liquid crystal display in accordance with the fourth embodiment is different from the third embodiment illustrated in FIG. 6 in that the first polarization layer 2 as well as the second polarization layer 7 is located intermediate between the first and second transparent substrates 3 and 9.

Similarly to the second polarization layer 7, the first polarization layer 2 is formed in accordance with one of the above-mentioned Processes A, B, C and D, among which the Processes C and D are preferable in view of simplicity of a process.

Hereinbelow are explained in more detail the above-mentioned first to fourth embodiments, as examples 1 to 4.

EXAMPLE 1

In Example 1, there is prepared a liquid crystal display having the same structure as that of the liquid crystal display illustrated in FIG. 4.

As the backlight source 1 is used a lamp including a fluorescent material excited with ultraviolet rays and emitting blue lights having a wavelength in the range of 380 nm to 420 nm. As such a fluorescent material for emitting blue lights may be used $SrP_2O_7$:Eu, $SrMgP_2O_7$:Eu, $Sr_3(PO_4)_2$:Eu, $(Sr, Ba)Al_2Si_2O_8$:Eu, $Y_2Si_2O_7$:Ce, $ZnGa_2O_4$:Li, Ti, $YTaO_4$:Nb, $CaWO_4$, BaFX:Eu (X indicates halogen), (Sr, Ca) O $2B_2O_3$:Eu, $SrAl_{12}O_{14}$:Eu, or $Y_2SiO_5$:Ce, for instance.

A commercially available polarizing plate is employed as the first polarization layer 2. The second polarization layer 7 is formed in accordance with the above-mentioned Process A, as follows.

First, a polyimide orientation film is applied onto the overcoat layer 14, and is fired to dry. For instance, as the polyimide orientation film is used polyimide commercially available from Nippon Gosei Gomu in the tradename "AL 1051". First and second glass substrates having the same size are prepared for forming the second polarization layer. The above-identified polyimide orientation film is applied to both the first and second glass substrates, and then, fired to dry. Thereafter, the orientation films applied onto the first and second glass substrates are rubbed. Then, 20 $\mu$m-spacers are scattered on the second glass substrate, and a polyimide film having a width of 2 mm and a thickness of 20 $\mu$m is formed at a periphery of the second glass substrate so that there is an opening in the polyimide film for introducing liquid crystal therethrough.

Then, the first and second glass substrates are overlapped and temporarily fixed with each other by means of a clamp in such a manner that rubbing directions in the first and second glass substrates are anti-parallel. The rubbing direction is dependent on a characteristic of a dichroism pigment introduced together with liquid crystal. However, in Example 1, the rubbing direction is adjusted so that a transmission axis of a polarized light is perpendicular to a transmission axis of the first polarization layer 2.

The overlapped and fixed first and second glass substrates are put into a vacuum chamber, and a mixture of photosensitive liquid crystal and a dichroism pigment is introduced into a space formed between the glass substrates. For instance, the mixture is comprised, at an appropriate mixture ratio, of 5CB liquid crystal commercially available from Merc Co., diacrylate compound described in Makromol, Chemistry, Vol. 190, pp. 2255, 1989, and a dichroism pigment described at Mol. Cryst. Liq. Cryst., Vol. 150A, pp. 3–167, 1987.

After the mixture has been introduced into the space through the opening, the opening is temporarily closed with a polyimide tape. Thereafter, the first and second glass substrates together with the mixture are heated to thereby eliminate flow orientation of the liquid crystal and the dichroism pigment, and make their arrangements even. Thereafter, ultraviolet (UV) rays are radiated onto a resultant to thereby induce cross-linking reaction of the photosensitive liquid crystal. In order to shorten a period of time for reaction, there may be used a photoreaction initiator as suggested in Makromol. Chem., Vol. 190, pp. 2255, 1989.

Thereafter, the second glass substrate is peeled off the first glass substrate. Thus, there is obtained the second polarization layer 7. If an orientation film containing fluorine having small surface energy were applied onto the second glass substrate, the second glass substrate could be readily and smoothly peeled off the first glass substrate.

In Example 1, it is preferable that the first, second and third fluorescent materials 10, 11 and 12, which emit red, green and blue lights, respectively, on receiving lights having a wavelength in the range of 380 nm to 420 nm, include at least one of the following elements or compounds.

The first fluorescent material 10 emitting a red light preferably contains $6MgO\ As_2O_5$:Mn, $3.5MgO\ 0.5MgF_2\ GeO_2$:Mn, $Na_5Eu(W_{1-x}Mo_xO_4)_4$ (X is in the range of 0 and 1), $K_5Eu(W_{1-x}Mo_xO_4)_4$ (X is in the range of 0 and 1), $SrY_2S_4$:Eu, $SrY_2S_4$:Mn, $Y_2O_2S_4$:Eu, or $NaGd_{1-x}Eu_xTiO_4$ (X is in the range of 0 and 1), for instance.

The second fluorescent material 11 emitting a green light preferably contains $SrAl_2O_4$:$Eu^{2+}$, $SrGa_2S_4$:Eu, $Ca_3SiO_4Cl_2$:Eu, $(PO_4)_6Cl_2$:Eu, $(Sr_{0.9}Ca_{0.1})_{10}(PO_4)_6Cl_2O$:Eu, $Ba_{2-x}Sr_xSiO_4$:$Eu^{2+}$(X is in the range of 0 and 2), $Y_3Al_5O_{12}$:Ce, $BaZrO_3$:Eu, ZnS:Cu, ZnS:Cu—Al, or ZnS:Cu—Au—Al, for instance.

The third fluorescent material 12 emitting a blue light preferably contains $Sr_{10}(PO_4)_6Cl_2$:Eu, $(Sr_{0.9}Ca_{0.1})_{10}(PO_4)_6Cl_2O$:Eu, $BaMg_2Al_{16}O_{27}$:Eu, $Ba_{3-x}Sr_xMgSi_2O_8$:Eu (X is in the range of 0 and 3), $Ba_5SiO_4Cl_6$:Eu, ZnS:Ag—Cl, ZnS:Ag—Al, ZnS:Ag, or ZnS:Ag—Ga, for instance.

As is obvious in view of FIG. 4, the liquid crystal display in accordance with Example 1 makes it no longer necessary to employ the third transparent substrate 302 which was employed in a conventional liquid crystal display, as illustrated in FIG. 3. As a result, the liquid crystal display in accordance with Example 1 ensures no parallax.

In the conventional liquid crystal display illustrated in FIG. 1, which employs the color filters 202, two-thirds or greater of lights emitted from the backlight source 201 was lost. Comparing to the conventional liquid crystal display illustrated in FIG. 1, the liquid crystal display in accordance with Example 1 can avoid such an optical loss in the color filters 202, and hence, ensure greater brightness than the conventional liquid crystal display. That is, Example 1 provides a liquid crystal display having greater brightness and no parallax.

For instance, the first transparent substrate 3 may be composed of a highly transparent material such as quartz, which can pass blue lights having a wavelength in the range of 380 nm to 420 nm, emitted from the backlight source 1. This ensures greater brightness.

EXAMPLE 2

A liquid crystal display in accordance with Example 2 has the same structure as that of the liquid crystal display in accordance with the second embodiment illustrated in FIG. 5. In Example 2, the first polarization layer 2 is located between the first and second transparent substrates 3 and 9. The first polarization layer 2 may be formed in accordance with the process having been mentioned in Example 1. As an alternative, the first polarization layer 2 may be formed in accordance with the above-mentioned Process C. That is, the first polarization layer 2 may be formed as follows, as suggested in Nature Vol. 351, pp. 49, 1991. A mixture of polyimide and azo-pigment is applied onto a substrate, and then, fired. Then, a polarized light is radiated over the mixture to thereby induce photo-isomerization of the azo-pigment. As a result, an absorption axis of the azo-pigment becomes perpendicular to, or parallel with, in some cases, a polarized light. Thus, there is completed the first polarization layer 2.

EXAMPLE 3

A liquid crystal display in accordance with Example 3 has the same structure as that of the liquid crystal display in accordance with the third embodiment illustrated in FIG. 6.

As the backlight source 101 is used a lamp containing a fluorescent material emitting blue lights having a wavelength in the range of 460 nm to 470 nm, such as $Sr_2P_2O_7:Sn^{2+}$, $SrMgAl_{10}O_{17}:Eu^{2+}$, $(Ba, Ca, Mg)_{10}(PO_4)_6Cl_2:Eu^{2+}$, $Ba_{3-x}Sr_xMgSi_2O_8:Eu$ (X is in the range of 0 and 3), ZnS:Ag, or ZnS:Ag—Ni.

A polarizing plate is used as the first polarization layer 2, and the second polarization layer 7 may be formed in the same manner as mentioned in Examples 1 and 2.

As an alternative, the second polarization layer 7 may be formed in accordance with the above-mentioned Process D, as follows. A mixture of a first compound having long-chain alkyl groups among dichroism pigments described in Mol. Cryst. Liq. Cryst. Vol. 150A, pp. 3–167, 1987, and a second compound having azide groups in a backbone chain of polymer, such as azide polymer commercially available from Sinko Giken Co., is applied onto a substrate, and then heated to dry. Then, polarized ultraviolet rays are radiated over the mixture. By radiation of polarized ultraviolet rays, only functional groups having a transition moment consistent with a direction of polarization are caused to react. Thereafter, non-reacted pigments are removed by washing the mixture with a solvent, if necessary. Thus, there is obtained the second polarization layer 7.

It is preferable that the first and second fluorescent materials 102 and 103, which emit red and green lights, respectively, on receiving lights having a wavelength in the range of 460 nm to 470 nm, include at least one of the following elements or compounds.

The first fluorescent material 102 preferably contains a coumarin pigment such as 2,3,5,6-1H, and 4H-tetrahydro-8-trifurolmethylquinoricino (9, 9a, 1-gh) coumarin (coumarin 153).

The second fluorescent material 103 preferably contains a cyanine pigment such as 4-dicyanomethylene-2-methyl-6-(p-dimethylaminostillyn)-4H-pyrane (DCM), a pyridine pigment such as 1-ethyl-2-(4-(p-dimethylaminophenyl)-1,3-butadienyl)-pyridium-barcolarate-(pyridine 1), a xanthene pigment such as rhodamine B and rhodamine 6C, or an oxazine pigment.

The transparent films 104 pass therethrough blue lights emitted from the backlight source 101. In principle, it is not necessary for the liquid crystal display to have the transparent films 104. However, the formation of the transparent films 104 advantageously uniformizes a gap width of the first transparent electrode 4 and the second transparent electrode 6.

Thus, Example 3 provides a liquid crystal display having greater brightness and no parallax.

EXAMPLE 4

A liquid crystal display in accordance with Example 4 has the same structure as that of the liquid crystal display in accordance with the fourth embodiment illustrated in FIG. 7. The first polarization layer 2 is located between the first and second transparent substrates 3 and 9. The second polarization layer 7 is formed in the same manner as those of the above-mentioned Examples 1 to 3.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-206224 filed on Jul. 31, 1997 including specification, claims, drawings and summary is incorporated herein by reference in its entirety.

What is claimed is:

1. A liquid crystal display comprising:
   a backlight source having a dominant emission peak at 460 to 470 nm;
   a first polarization layer in vertical alignment with said backlight source and for selecting a light directed in a predetermined direction among light emitted from said backlight source;
   a second polarization layer in vertical alignment with said first polarization layer and for receiving a light selected from said first polarization layer;
   first and second light-permeable substrates located on opposite sides of said second polarization layer;
   first and second light-permeable electrodes located on opposite sides of a liquid crystal layer; and
   a fluorescent material layer in vertical alignment with and receiving lights from said backlight source and emitting a light therefrom,
   wherein said fluorescent material layer includes a first fluorescent material emitting red lights in response to lights emitted from said backlight source, a second fluorescent material emitting green lights in response to lights emitted from said backlight source, transparent film passing therethrough lights emitted from said backlight source, said first and second fluorescent materials and said transparent film being arranged in a line, and light-impermeable layers located between said first and second fluorescent materials and said transparent film.

2. The liquid crystal display as set forth in claim 1, wherein said fluorescent material layer further includes an overcoat layer composed of light-permeable resin and covering said first and fluorescent materials and said transparent film therewith.

* * * * *